United States Patent [19]
Menchetti

[11] Patent Number: 5,575,131
[45] Date of Patent: Nov. 19, 1996

[54] MULTIPLE USE CORNER CLIP

[75] Inventor: Robert J. Menchetti, Buffalo, N.Y.

[73] Assignee: National Gypsum Company, Charlotte, N.C.

[21] Appl. No.: 468,370

[22] Filed: Jun. 6, 1995

Related U.S. Application Data

[60] Division of Ser. No. 92,968, Jul. 19, 1993, abandoned, which is a continuation-in-part of Ser. No. 22,590, Feb. 25, 1993.

[51] Int. Cl.⁶ ........................................... E04B 1/00
[52] U.S. Cl. .................. 52/745.09; 52/272; 52/288.1; 52/489.1; 52/282.3
[58] Field of Search ........................... 52/265, 266, 267, 52/272, 274, 275, 277, 489.1, 506.03, 506.04, 745.09, 745.05, 745.1, 781.3, 282.3, 288.1, 285.1–285.3

[56] References Cited

U.S. PATENT DOCUMENTS

| | | |
|---|---|---|
| 1,825,010 | 9/1931 | Murphy . |
| 2,027,882 | 1/1936 | Ross .................................. 52/280 X |
| 2,044,637 | 6/1936 | Ross ................................ 52/489.1 X |
| 2,047,835 | 7/1936 | Prew . |
| 2,049,278 | 7/1936 | Toussaint et al. ................ 52/489.1 X |
| 2,078,620 | 4/1937 | Venzie . |
| 2,185,904 | 1/1940 | Stowe . |
| 2,307,898 | 1/1943 | Olsen .................................. 52/285.3 |
| 2,351,525 | 6/1944 | Leary .................................. 52/285.3 |
| 2,638,637 | 5/1953 | Kump, Jr. . |
| 3,013,644 | 12/1961 | Smith et al. ........................... 52/690 |
| 3,176,432 | 4/1965 | Doolittle, Jr. . |
| 3,225,503 | 12/1965 | Rallis . |
| 3,242,627 | 3/1966 | Fountain ............................... 52/494 |
| 3,266,209 | 8/1966 | Zibell . |
| 3,271,920 | 9/1966 | Downing, Jr. . |
| 3,274,739 | 9/1966 | Gregoire . |
| 3,287,041 | 11/1966 | Cohen .................................. 52/658 X |
| 3,294,353 | 12/1966 | Rowe . |
| 3,477,184 | 11/1969 | Johnson et al. ...................... 52/261 X |
| 3,651,610 | 3/1972 | Donahue ........................... 52/288.1 X |
| 3,765,138 | 10/1973 | Bentle . |
| 3,845,601 | 11/1974 | Kostecky ............................ 52/656 X |
| 3,881,293 | 5/1975 | Conville . |
| 3,921,346 | 11/1975 | Sauer et al. . |
| 4,002,261 | 1/1977 | Litchfield ........................... 52/282.3 X |
| 4,024,691 | 5/1977 | Hansen et al. ...................... 52/656 X |
| 4,240,234 | 12/1980 | Eisinger et al. ......................... 52/261 |
| 4,435,936 | 3/1984 | Rutkowski . |
| 4,443,991 | 4/1984 | Mieyal ............................. 52/287.1 X |
| 4,587,783 | 5/1986 | McCoy et al. . |
| 4,909,006 | 3/1990 | Hickman et al. . |
| 4,982,540 | 1/1991 | Thompson . |
| 5,090,174 | 2/1992 | Fragale ............................. 52/288.1 X |
| 5,092,100 | 3/1992 | Lambert et al. . |
| 5,263,293 | 11/1993 | Laird et al. ...................... 52/489.1 X |

FOREIGN PATENT DOCUMENTS

| | | |
|---|---|---|
| 393000A | 10/1990 | European Pat. Off. . |
| 1432551 | 2/1966 | France ................................. 52/282.1 |
| 5-112992 | 5/1993 | Japan . |

Primary Examiner—Carl D. Friedman
Assistant Examiner—Winnie Yip
Attorney, Agent, or Firm—Marshall, O'Toole, Gerstein, Murray & Borun

[57] ABSTRACT

A hollow shaft wall stud corner clip adjoins ends of horizontal studs at a shaft wall structure corner and is readily adaptable for supporting core boards in a fire rated ceiling or a fire rated duct and for holding core board in place at a top or a bottom of a horizontal stud hollow shaft wall. The clip has a central web for positioning against a stud or track flange and an angled flange with a core board-supporting extremity.

6 Claims, 6 Drawing Sheets

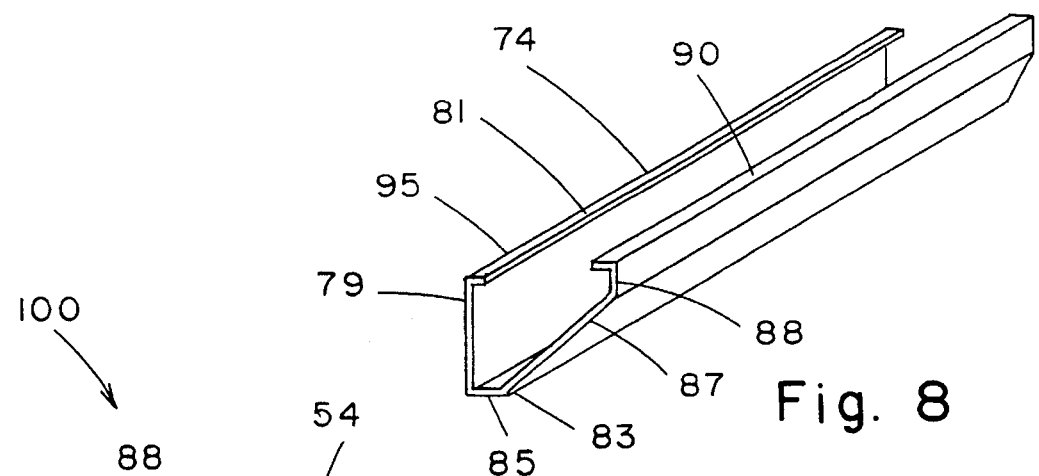
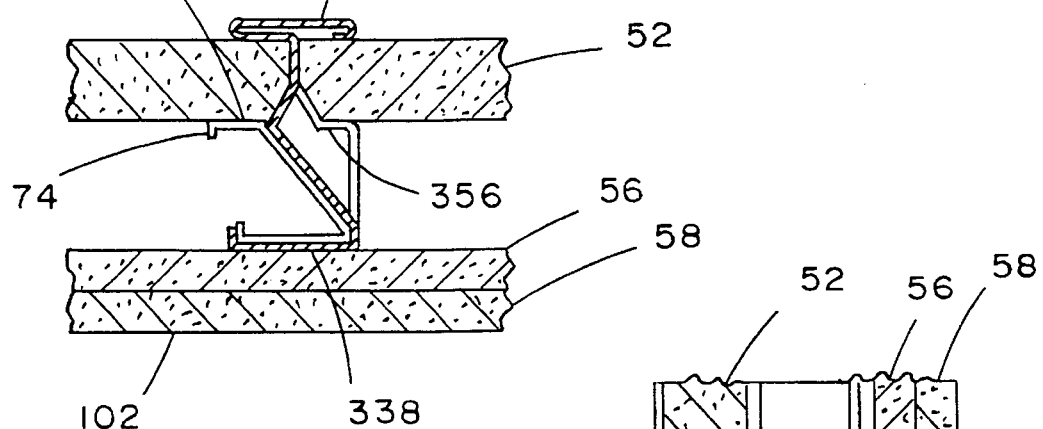
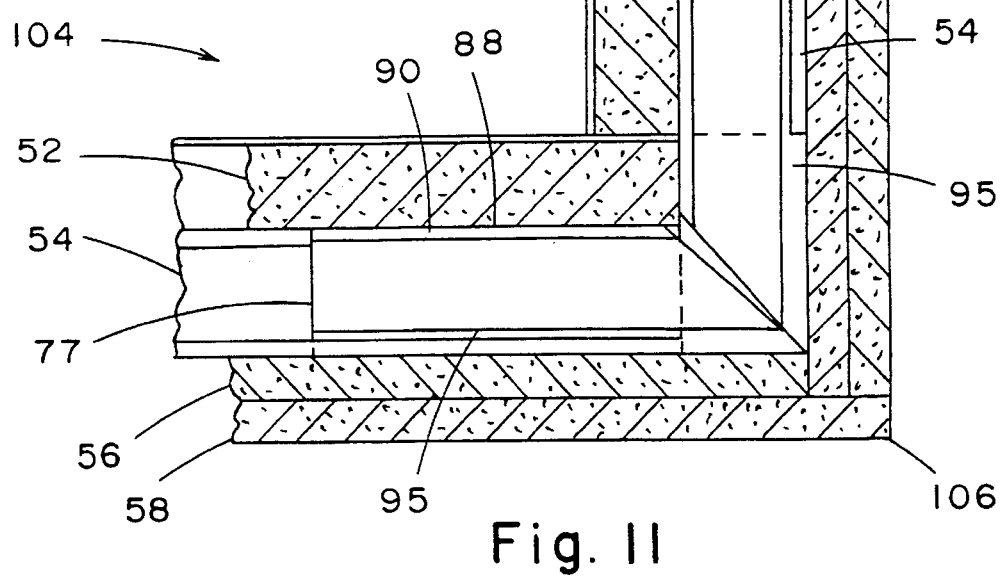
Fig. 8
Fig. 10
Fig. 11

MULTIPLE USE CORNER CLIP

This application is a division of my application Ser. No. 08/092,968, filed Jul. 19, 1993, now abandoned which is a continuation-in-part of my application Ser. No. 08/022,590, filed Feb. 25, 1993.

This invention relates to a small metal clip for connecting horizontal studs at a vertical corner of a horizontal stud wall and which is readily adaptable for several other uses in the construction of walls, ceilings and duct work.

BACKGROUND OF THE INVENTION

A wall has been developed in which a plurality of horizontal metal studs and horizontally extending gypsum core boards are erected alternately one on top of another with vertical stability being provided by a vertical post having a vertically extending channel into which each of the horizontal studs and core boards extend. Generally, such horizontal stud walls will include a vertical corner post with channels opening in two perpendicular directions, whereby the horizontal studs and the core boards of two perpendicularly abutting walls are joined.

SUMMARY OF THE INVENTION

The present invention is directed to a lower cost horizontal stud wall, wherein vertical corner posts of the prior wall are omitted and in their place small sheet metal stud corner clips connect the ends of perpendicularly extending horizontal studs and optionally small core board corner clips connect the ends of perpendicularly extending core boards.

It is an object of the present invention to provide small, low cost corner clips as a replacement for full wall height corner posts in horizontal stud walls.

It is a further object to provide a wall corner clip which is readily adaptable for other wall construction uses.

It is a further object to provide a lower cost horizontal stud wall.

It is a still further object to provide a novel method of erecting a horizontal stud wall.

BRIEF DESCRIPTION OF THE DRAWINGS

These and other objects and advantages will be more readily apparent when considered in relation to the preferred embodiments of the invention as set forth in the specification and shown in the drawings in which:

FIG. 7 is an isometric view of the core board corner clip of FIG. 1 affixed to two perpendicularly directed core boards.

FIG. 8 is an isometric view of the modified clip of FIGS. 1 and 2.

FIG. 10 is an end sectional view of a horizontal stud employed in a fire rated ceiling with a modified clip supporting a horizontally disposed core board.

FIG. 11 is a sectional view of a bottom corner of a horizontal air duct.

DESCRIPTION OF THE PREFERRED EMBODIMENTS

Figure 1:
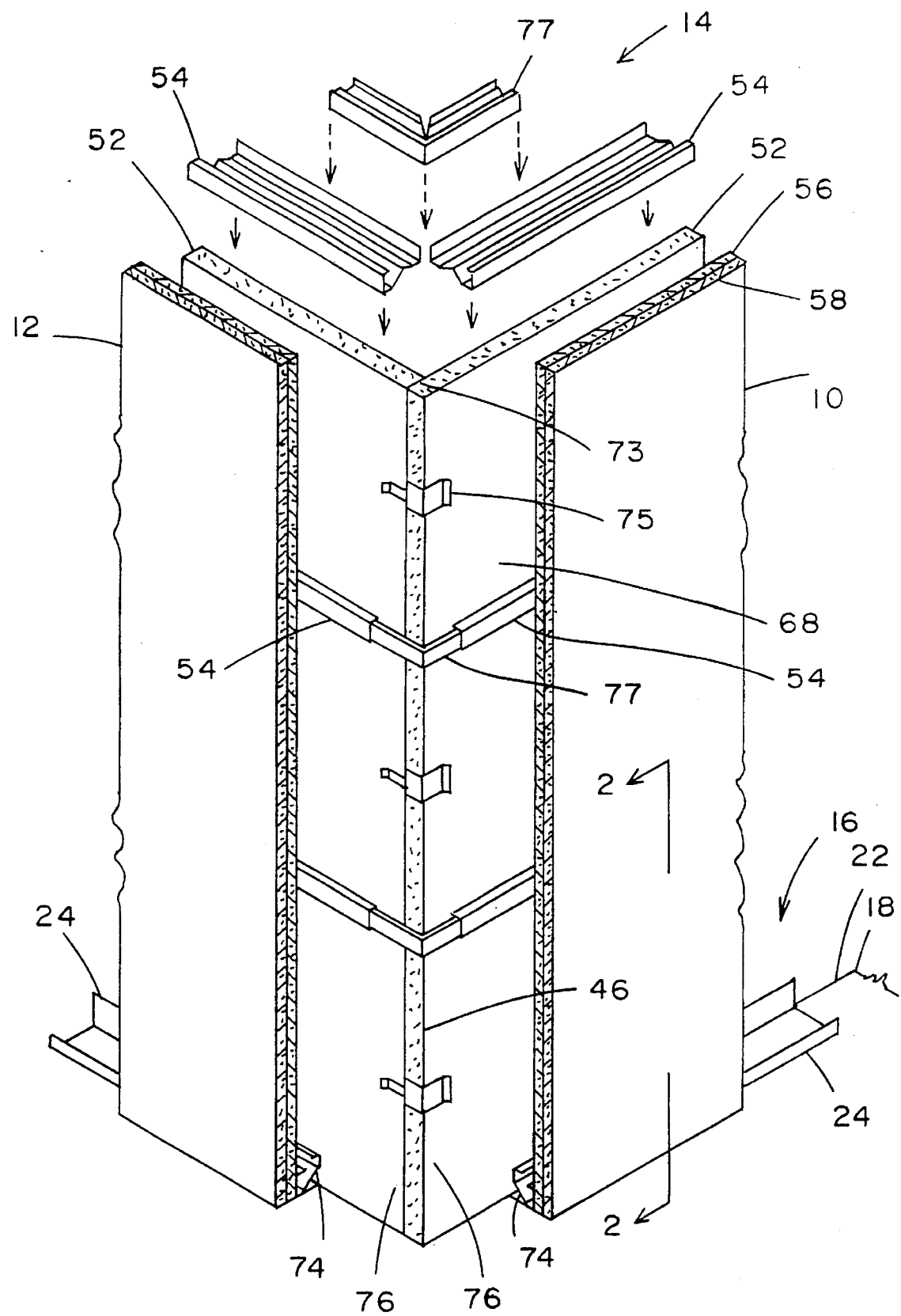
FIG. 1 is an isometric front view of a horizontal stud wall corner, partially constructed, with elements exploded upwards, and with outer wallboards cut away, further including a modified clip at the floor track.
Figure 2:
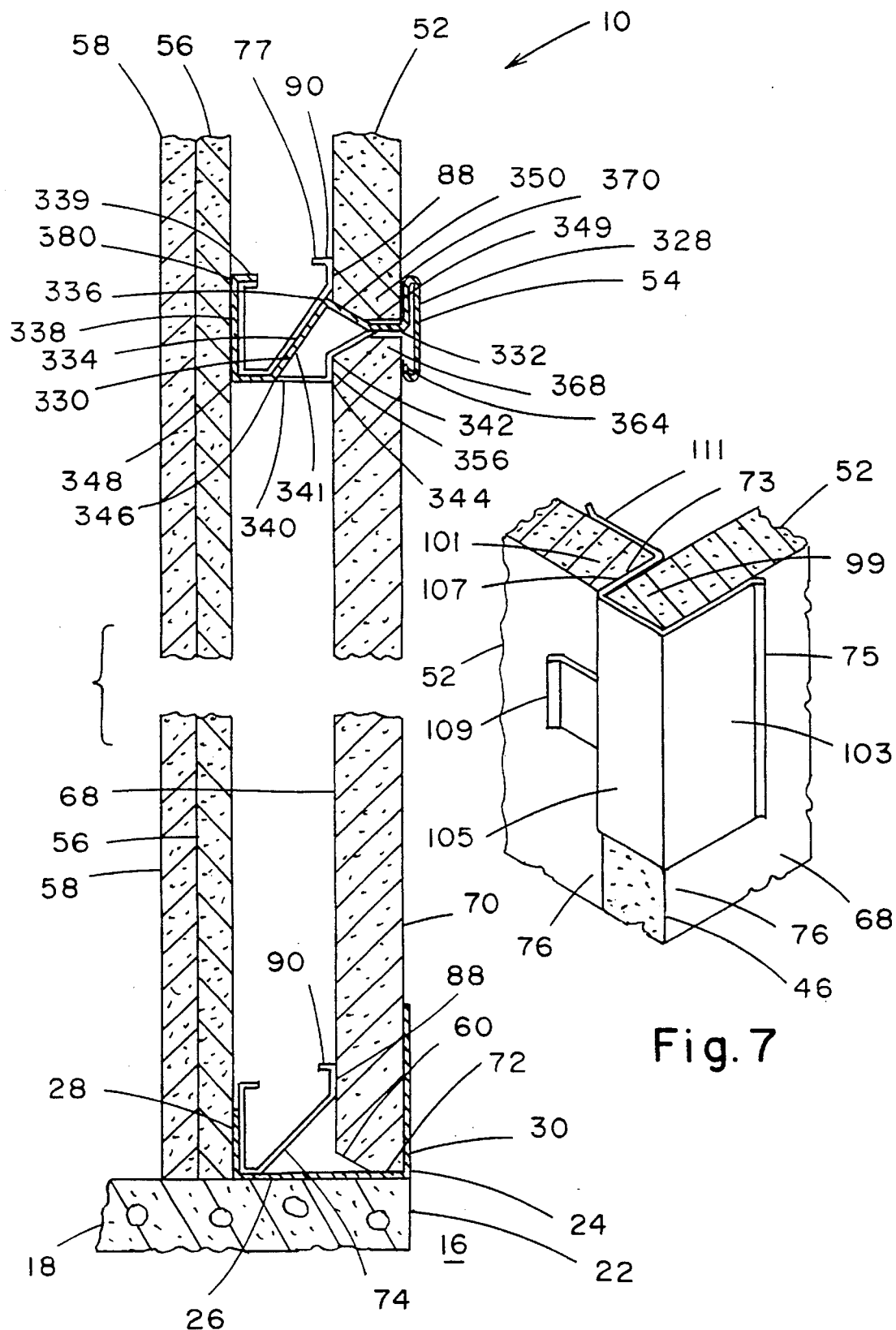
FIG. 2 is a vertical sectional view of a horizontal stud, core board, outer wallboard, a corner clip and a modified clip taken on line 2—2 of FIG. 1.
Figure 3:
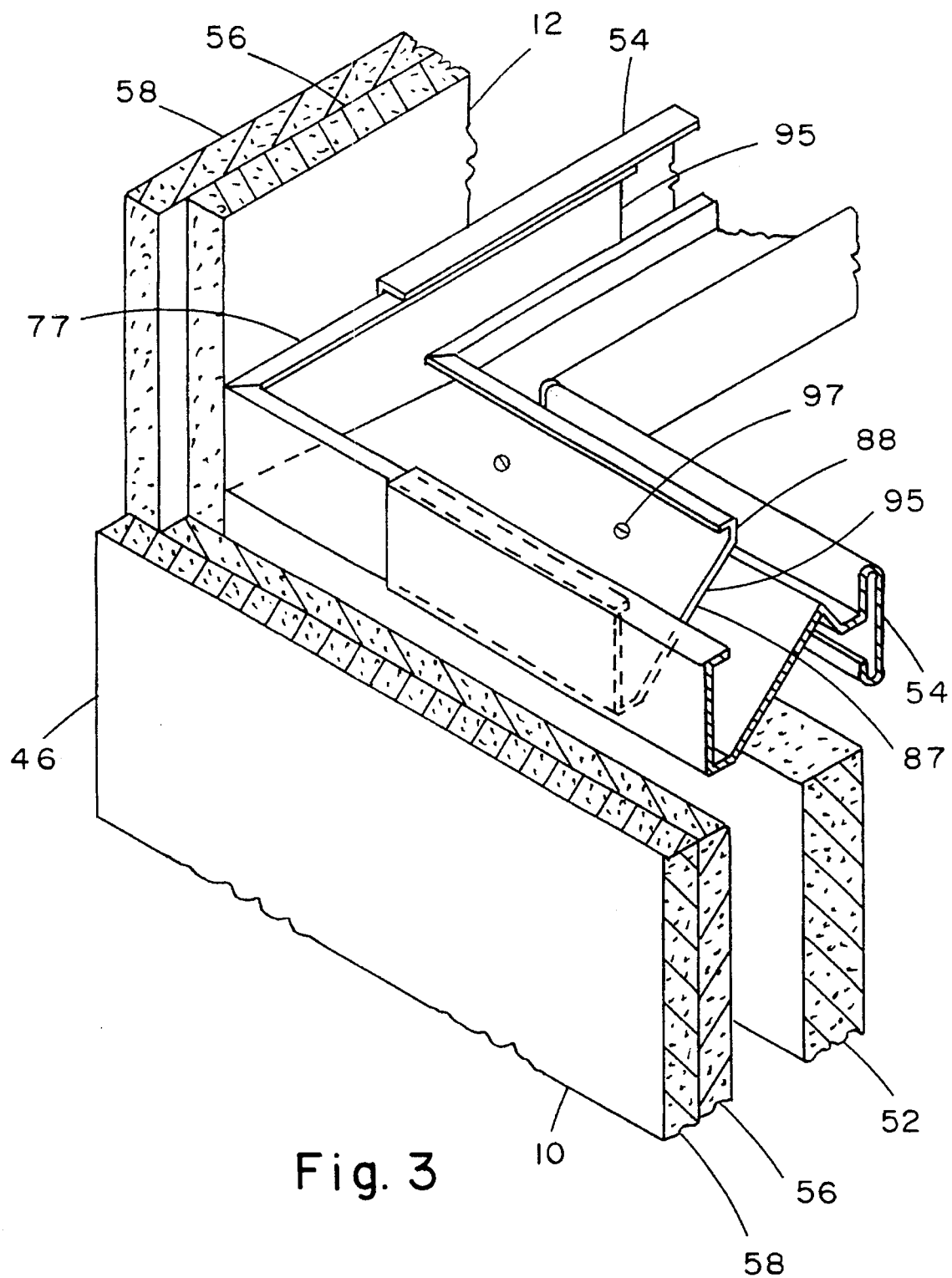
FIG. 3 is an enlarged isometric side view of the corner of FIG. 1, with outer wallboard cut away.

Referring to FIGS. 1–3, there is shown part of a side wall 10 and part of a front wall 12 of a hollow shaft wall structure 14 surrounding an elevator shaft 16. Elevator shaft 16 extends vertically through a plurality of floor-ceiling platforms, including the lower platform 18 and an upper platform 19, FIG. 9. The shaft wall structure 14 extends vertically from the lower platform 18 to the upper platform 19 along the edges 22 of these floor-ceiling platforms which surround and form the elevator shaft 16.

Side wall 10 consists of standard upwardly opening, channel-shaped floor track 24, having a horizontal web 26 and two vertical flanges 28, 30 and a similar downwardly opening ceiling track 31. Floor track 24 is mechanically affixed to the top of lower platform 18 and the ceiling track 31 is mechanically affixed to the bottom of the upper platform 19, each adjacent the edges 22 of these floor-ceiling platforms.

At the corner 46 of side wall 10 and front wall 12, two floor tracks 24 and two ceiling tracks 31 meet to form a 90° corner.

FIGS. 1–3 show the arrangement of core boards 52, horizontal studs 54 and outwardly disposed gypsum wide wallboards 56, 58, which combine to form the side wall 10 and the front wall 12.

Typically the core boards 52 are paper-covered gypsum boards which are, in cross section, 2 feet by 1 inch, and will normally have a length equal to the extent of the wall 10, 12. The core boards have bevelled edges 60, 62 along the two long edges of each core board 52. Alternatively, non-bevelled board can be used. Preferably, the bevelled edges 60, 62 have a flat portion 72, of a width of about ⅜ inch, however, this could be varied considerably.

The first core board 52 to be installed in constructing wall 10 has a flat portion 72 resting on web 26 of floor track 24 and inner face 70 is held against inner flange 30 by a plurality of modified clips 74. The ends 76 of core boards 52 of the two respective walls 10, 12 meet at the corner 46, and the outer face 68 of one core board 52 overlaps the end edge 73 of the other core board 52.

The two core boards are held in place by novel, small core board corner clips 75, affixed on the ends 76 of the abutting core boards 52.

On top of the first core boards 52 to be installed in the walls 10, 12 are the first horizontal studs 54 to be installed, and progressively, in constructing walls 10, 12, additional core boards 52 and horizontal studs 54 alternately are put into place.

The horizontal studs 54 all extend to very closely adjacent the corner 46, and horizontal studs 54 at each respective level of walls 10, 12 are rigidly connected, one to the other, by novel stud corner clips 77.

The horizontal studs 54 in the preferred embodiment, are an elongate roll-formed sheet of metal with a cross section which includes an inner flange 328, a web 330 extending perpendicularly outwardly from the middle of inner flange 328 about ⅝ inch, forming a flat portion 332, whereat a major portion 334 of web 330 extends upwardly and outwardly about ⅝ inch to bend 336 and thence downwardly and outwardly to an upwardly extending outer flange 338. Outer flange 338 extends upwardly to an inwardly directed lip 339. A minor portion 340 of web 330, about a 3-inch length of each foot of web, extends downwardly and outwardly about ⅝ inch to bend 342, thence downwardly to bend 344 and thence outwardly to upwardly extending outer flange 338. Slits 346 were cut crosswise of web 330, during forming of horizontal stud 54, from the flat portion 332 to the outer flange 338. The slits 346 are preferably angled slightly to form minor portions 340 which have a shorter dimension along the outer flange bend 348 than along the bend 349, whereat the minor portion 340 is adjoined the flat portion 332.

Horizontal stud 54 is mounted atop an upper edge portion 368 of one of the two core boards 52, and a lower edge portion 370 of the other core board 52 is disposed atop stud 54.

The upper edge portion 368 is held firmly between board holding portion 356 of web minor portion 340 and the hem 364 of inner flange 328.

The lower edge portion 370 of the other core board 52 is held between the ramp portion 350 and inner flange 328.

Gypsum wide wallboard 56, 58 is screw attached against the outer surfaces 380 of the outer flanges 338, and to the stud corner clips 77.

Figure 4:
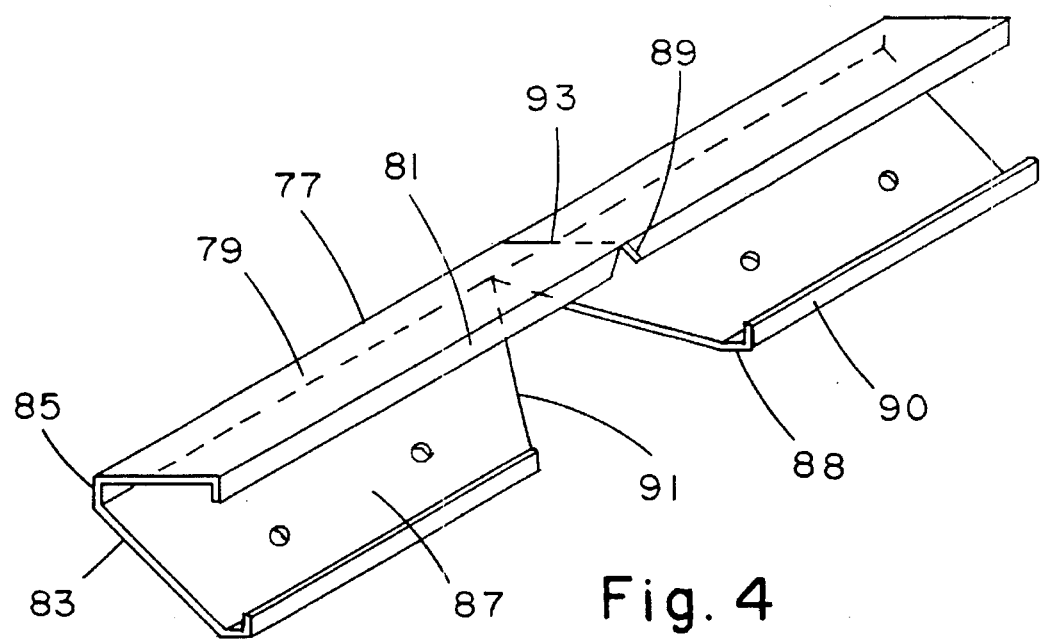
FIGS. 4 and 5 are isometric views of the stud corner clip of FIG. 1 prior to the final forming and as finally formed.
Figure 5:
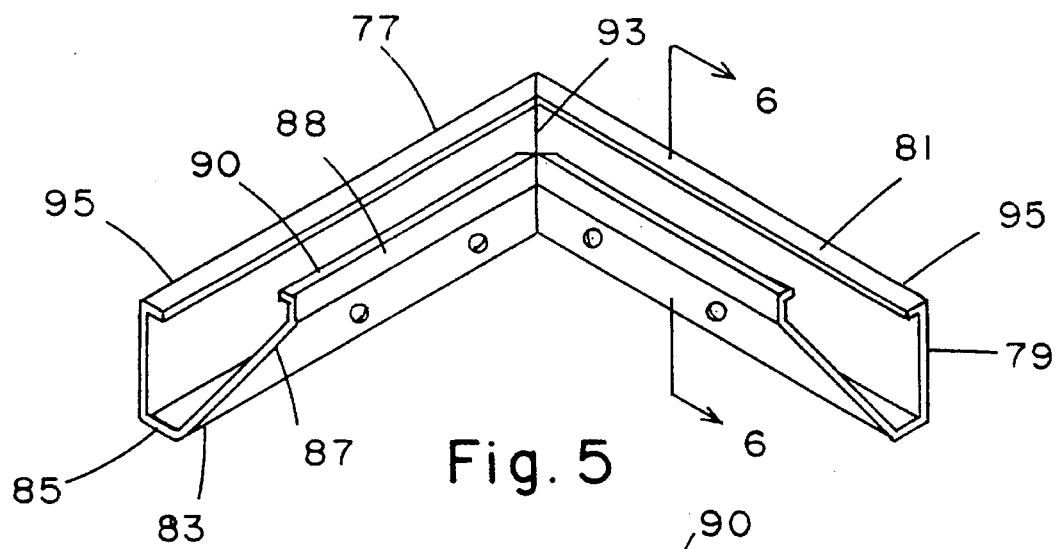
Figure 6:
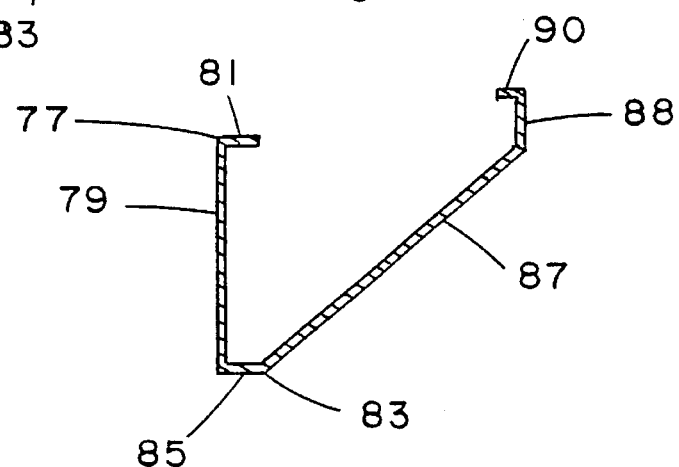
FIG. 6 an end sectional view of the finally formed clip of FIG. 5, taken on line 6—6.

In the preferred embodiment, stud corner clips 77 are formed from a single piece of sheet metal, FIGS. 4–6, having central web portion 79, an inwardly turned, narrow, top flange 81 and an inwardly turned, bottom flange 83. Bottom flange 83 includes a narrow, bottom portion 85, an inwardly and upwardly directed, wide-angled portion 87, and finally, a narrow, upwardly extending, board-supporting leg 88 with an inwardly directed lip 90. In order to form the stud corner clip 77, the top flange 81 and the bottom flange 83 are notched to form a 90° V-notch 89 in the top flange and a 90° V-notch 91 in the bottom flange. Notches 89 and 91 permit the web portion 79 to be bent 90° at fold 93, creating two perpendicular segments 95 forming the finished stud corner clip 77, with the notches completely closed. The top flange 81 and bottom flange 83 of the finished stud corner clip 77 become continuous around the fold 93 and may be welded where the notches 89 and 91 severed the flanges, if a more rigid stud corner clip 77 is desired.

The cross section of the stud corner clip 77 is identical to, but slightly smaller than, the cross section of the horizontal stud outer flange 338, lip 339 and the adjacent downwardly and outwardly portion 341 of the web major portion 334, whereby the two stud corner clip segments 95 can each be engaged firmly within the confines of the outer flange 338, lip 339 and portion 341. Stud corner clip 77 is also screw affixed to horizontal stud 54 by screws 97. The upwardly extending, board-supporting leg 88 will be seen to be pressing against a core board 52, providing more positive positioning of the core board 52 against inner flange 328.

Core board corner clips 75 aid in the construction of shaft wall structure by holding abutting core boards 52 together at the corner 46 while horizontal studs are being placed thereon and being adjoined by a stud corner clip 77. With the preferred form of horizontal stud 54, core boards 52 will generally stay in place without core board corner clips 75 until upper horizontal studs 54 and corner clips 75 are mounted thereon, however, core board corner clips 75 do contribute to ease of erection and stability of the completed shaft wall structure 14. Core board corner clips 75 are formed of a single piece of sheet metal bent to form a pair of perpendicular directed channels 99, 101. Channels 99, 101 are formed by the shape of core board corner clip 75, which includes a first flange 103, a bottom wall 105 and a central wall 107 forming channel 99. Central wall 107 has a small lip 109, which is cut and bent out of central wall 107. A second flange 111 extends perpendicularly from the end of central wall 107, parallel to lip 109, which together form channel 101, perpendicular to channel 99. The perpendicularly extending core boards 52 have ends 76 extending respectively into channels 99, 101.

Figure 9:
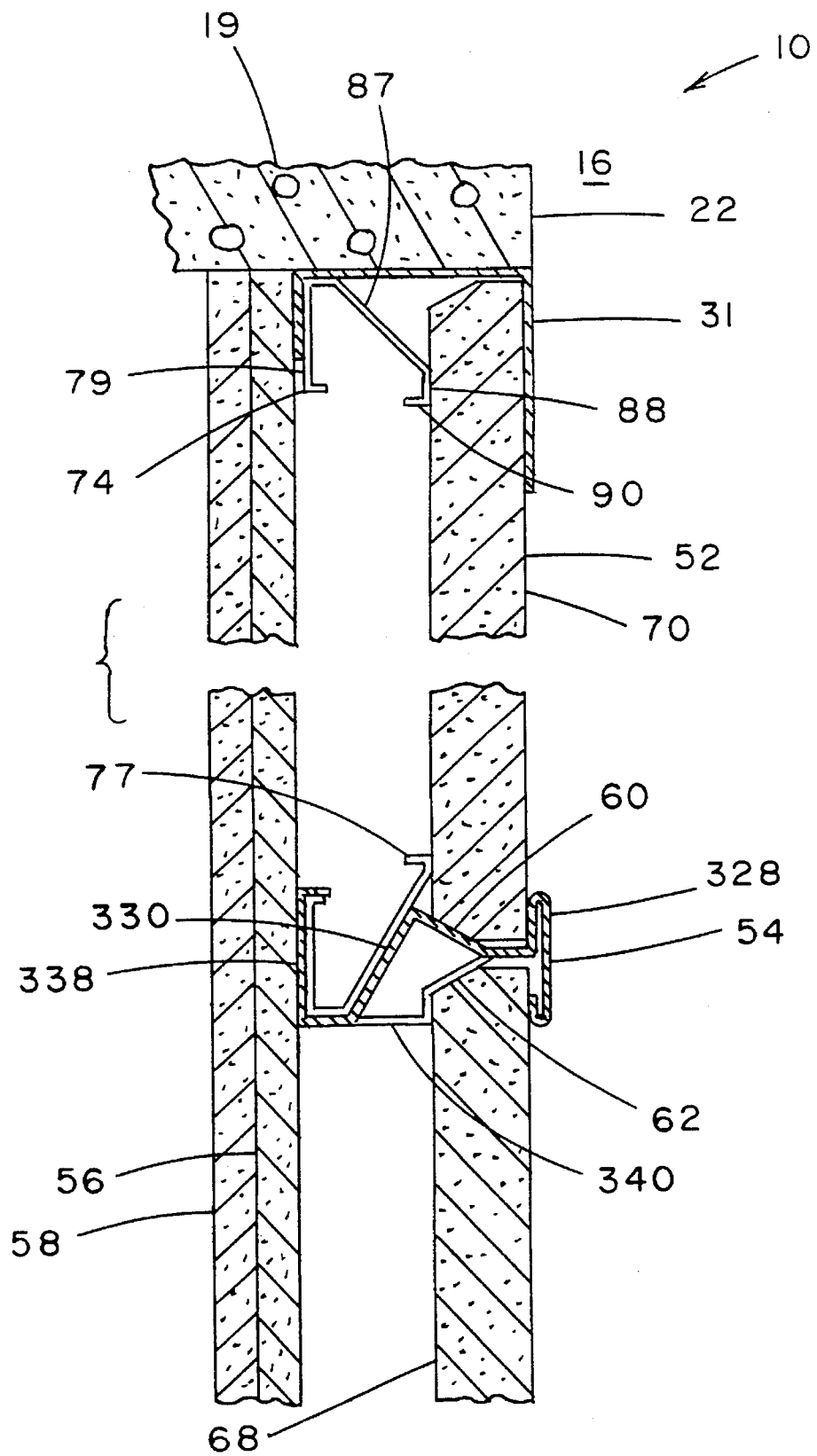
FIG. 9 is a vertical sectional view of the top of the wall of FIG. 2.

Referring now more particularly to FIGS. 2 and 9, there is shown the bottom and top portions of side wall 10. A modified clip 74, which can be either a stud corner clip 77 which has been straightened out at fold 93, or alternatively can be one of the two segments 95, formed by cutting a stud corner clip 77 in half at fold 93, is shown holding a core board 52 against inner flange 30 of floor track 24 and a second modified clip 74 is shown similarly holding a core board 52 inwardly in the ceiling track 31.

FIG. 10 shows a fire rated ceiling 100, wherein core boards 52 are disposed horizontally between studs 54 and a modified clip 74 is disposed within stud 54, with board-supporting leg 88 providing additional support to the core board 52 which is less firmly supported by stud 54. The other core board 52 is firmly supported by board holding portion 356. Wallboards 56, 58 are affixed to the outer flange 338 of stud 54, forming the ceiling surface 102.

FIG. 11 shows a bottom corner of a fire rated air duct 104, wherein studs 54, core boards corner clips 77 and wallboard 56, 58 are combined in a relationship similar to the structure of corner 46 of FIG. 1, but with a corner 106 which extends horizontally rather than vertically. In the air duct 104, the corner clip 77 provides support for the core boards 52, with board-supporting leg 88 functioning similar to the manner described above for a fire rated ceiling 100.

Having completed a detailed disclosure of the preferred embodiments of my invention, so that those skilled in the art may practice the same, I contemplate that variations may be made without departing from the essence of the invention.

I claim:

1. The method of erecting a horizontal stud wall corner comprising the steps of mounting horizontal studs and horizontally extending core boards alternately one upon another to form one vertical wall, mounting horizontal studs and horizontally extending core boards alternately one upon another to form a second vertical wall, each of said stud including a web extending between flanges and said core boards engaging said web, with the ends of said walls adjacent one another at a corner and with said walls extending horizontally at an angle to one another forming said corner, the improvement comprising:

adjoining the two walls by connecting the ends of respective abutting horizontal studs with individual small stud corner clips, said stud corner clips engaging said webs, affixing said small stud corner clips to the said stud ends, and engaging said core boards with said small stud corner clips and partially supporting said core boards with a board-supporting portion of said stud corner clips.

2. The method of claim 1, wherein said small stud corner clips have a pair of angularly directed segments with a cross section conforming to a cross section of said horizontal stud, further comprising inserting said pair of segments respectfully into said horizontal studs with said board-supporting portions disposed against said core boards.

3. The method of erecting a horizontal stud wall corner comprising the steps of mounting horizontal studs and horizontally extending core board alternately one upon another to form one vertical wall, mounting horizontal studs and horizontally extending core boards alternately one upon another to form a second vertical wall, each of said stud including a web extending between flanges and said core boards engaging said web, with the ends of said walls being adjacent one another at a corner and with said walls extending horizontally at an angle to one another forming said corner, the improvement comprising:

adjoining the two walls by connecting the ends of respective abutting horizontal studs with individual small stud corner clips, said stud corner clips engaging said webs, affixing said small stud corner clips to the said stud ends, each of said small stud corner clips including a pair of angularly directed segments and each of said segments having a cross section conforming to a cross section of said horizontal stud, and inserting said pair of segments into said horizontal studs, whereby no vertical corner post is need for holding the ends of said horizontal studs and said core boards.

4. The method of claim 3, wherein wallboard is affixed to said studs and to said small stud corner clips, further stabilizing said horizontal stud wall corner.

5. The method of claim 3, wherein two floor tracks are first affixed to a lower platform, along where said one vertical wall and said second vertical wall are to be erected, placing first core boards vertically on said floor tracks with ends of said core boards abutting one another at said corner, connecting said first core boards at said corner with small core board corner clips.

6. The method of claim 5, wherein said small core board corner clips have a pair of channels with openings directed substantially perpendicular to one another, further comprising inserting said core board ends respectively into said pair of channels.

\* \* \* \* \*

UNITED STATES PATENT AND TRADEMARK OFFICE
CERTIFICATE OF CORRECTION

PATENT NO.   : 5,575,131

DATED        : November 19, 1996

INVENTOR(S)  : Robert J. Menchetti

It is certified that error appears in the above-identified patent and that said Letters Patent is hereby corrected as shown below:

Column 4, line 32, please insert --52,-- after the words "core boards."

Column 6, line 2 (Claim 3), please replace the word "need" with the word --needed--.

Signed and Sealed this

Twenty-first Day of October 1997

Attest:

BRUCE LEHMAN

Attesting Officer

Commissioner of Patents and Trademarks